United States Patent Office 3,126,039
Patented Mar. 24, 1964

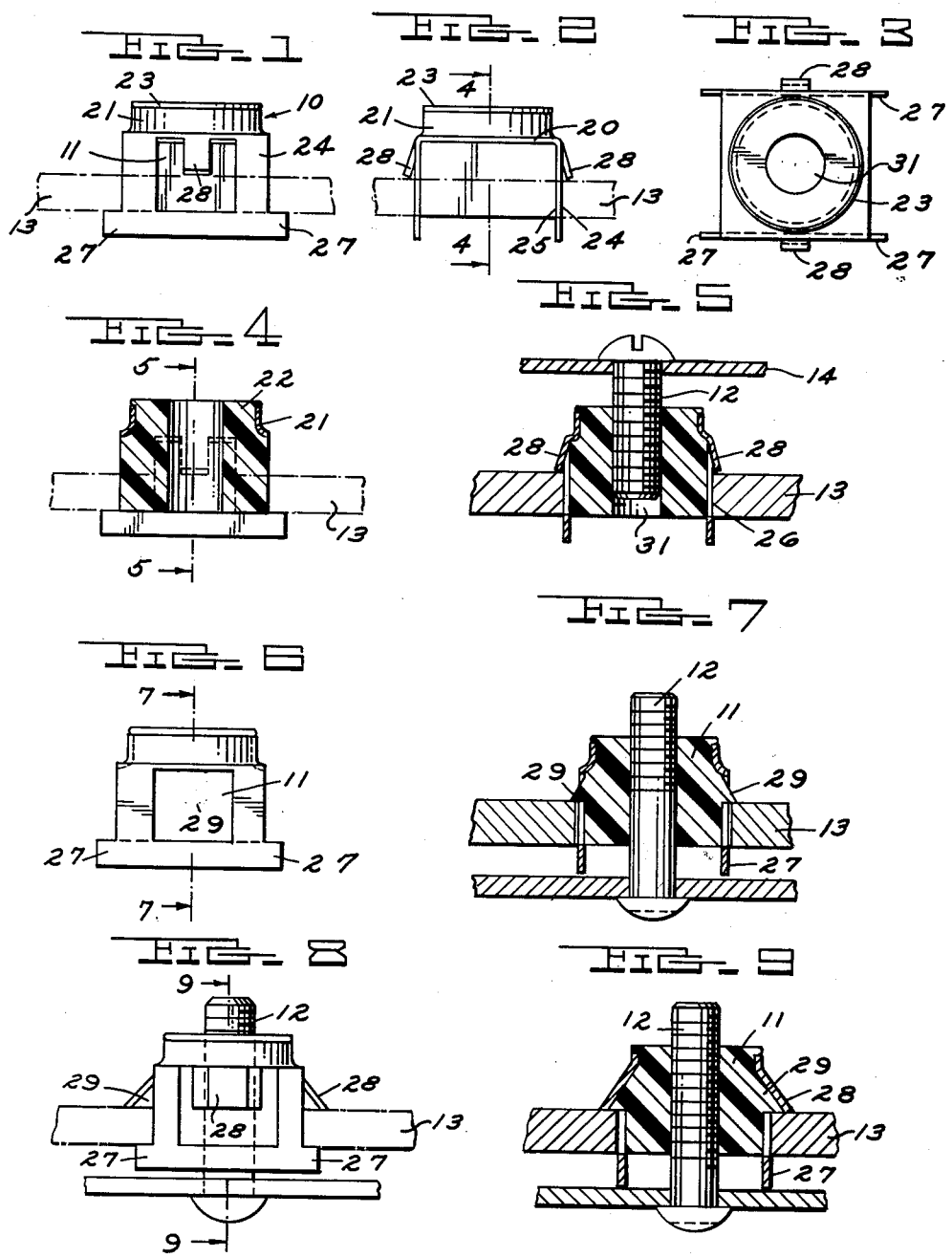

3,126,039
NUT COMBINATION
Theodore E. Fiddler, 1200 Cedar Ave.,
Birmingham, Mich.
Filed Oct. 30, 1961, Ser. No. 148,422
3 Claims. (Cl. 151—41.75)

This invention relates to a self attaching and holding nut combination for quick insertion in a workpiece aperture and which resists bolt pull in either axial direction, and which locks on an inserted bolt preventing loosening between the bolt and nut even under high vibratory conditions.

Self attaching and self locking nuts have been employed heretofore to facilitate the efficiency in manufacturing operations, however, the several devices of the prior art have not proved entirely satisfactory inasmuch as they are complicated in design and construction, expensive to manufacture, and difficult to use.

Moreover, they do not have desirable self attaching characteristics nor do they have satisfactory self locking characteristics which insure against loosening under high vibratory conditions such as in construction of automobiles which are constantly vibrated.

With the foregoing in view, the primary object of the invention is to provide a self locking and self attaching nut assembly which is simple in design and construction, inexpensive to manufacture, easy to use, easy to install, and which has a high locking efficiency which does not loosen even under high vibratory conditions.

An object of the invention is to provide a cage member which is insertable in the aperture of a workpiece which has means including opposed tangs and fingers for gripping the workpiece on either side for resisting bolt pull in either axial direction.

An object of the invention is to provide a plastic core body for the cage member for lockingly receiving the bolt therein and for gripping same and holding the bolt against loosening even under high vibratory conditions.

An object of the invention is to unite the core body and the cage member by spinning or peening the neck on the core body over a collar on the cage member.

An object of the invention is to provide shoulders on the cage member which abut the core body for resisting axial bolt movement in one direction and a collar on the cage member which abuts a head on the core body for resisting axial bolt movement in the opposite direction.

An object of the invention is to provide wedge grips integral with the core body for gripping the workpiece on one side thereof upon insertion therein singly and in combination with the grip tangs of the cage member.

These and other objects of the invention will become apparent by reference to the following description of a self attaching and locking nut assembly embodying the invention taken in connection with the accompanying drawing in which:

FIG. 1 is a side elevational view of a nut assembly embodying the invention as seen from the left of FIG. 2 showing a workpiece in dotted lines.

FIG. 2 is a side elevational view of the nut assembly seen in FIG. 1 such as from the right side of FIG. 1 showing the workpiece in dotted lines.

FIG. 3 is a top plan view of the device seen in FIGS. 1 and 2.

FIG. 4 is a cross-sectional view of the device seen in FIG. 2 taken on the line 4—4 thereof showing a workpiece in dotted lines.

FIG. 5 is a cross-sectional view of the device seen in FIGS. 1 through 4 taken on the line 5—5 of FIG. 4 and additionally showing workpieces and an interconnecting bolt.

FIG. 6 is a view similar to FIG. 1 showing a modified device wherein the cage tangs are deleted and a grip wedge is carried by the core body.

FIG. 7 is a cross-sectional view of FIG. 6 taken on the line 7—7 and additionally showing workpieces and an interconnecting bolt.

FIG. 8 is a side elevational view of a modified device showing workpieces in cross section wherein both tangs on the cage member and grip wedges on the core body are employed; and FIG. 9 is a cross-sectional view of the device seen in FIG. 8 taken on the line 9—9 thereof.

Referring now to the drawing wherein like numerals refer to like and corresponding parts throughout the several views, the inventive nut assemblies disclosed therein to illustrate the invention comprises a cage 10 housing a core 11 with the cage 10 engaging the first workpiece 13 and with the core engaging the bolt 12 for attaching the second workpiece 14 to the workpiece 13.

More particularly, the cage 10 comprises shoulders 20 which overlie the plastic or malleable core 11 preventing it from moving in one axial direction with the cage shoulders being surmounted by a collar 21 surrounding the neck 22 on the core 11 and it is to be noted that the core neck 22 has a head 23 surmounting and overlying the cage collar 21 so as to prevent the core 11 from axial movement in the opposite direction from movement prevented by the engagement of the cage shoulders 20 and the core 11, and it can now be seen that the core and the cage are connected together and that relative rotation between them is prevented by the fact that the cage arms 24 engage the sides 25 of the core 11.

The nut assembly is secured to a workpiece 13 by locating it in an aperture 26 thereof so that the extending cage fingers 27 on the arms 24 lie beneath the workpiece 13 and prevent the nut assembly from moving upwardly as seen in the drawing. Conversely, the cage tangs 28 lead downwardly outwardly from the shoulders 20 and engage the opposite side of the workpiece 13 in opposition to the fingers 27 preventing axial movement of the nut assembly in the opposite direction or downwardly as seen in the drawing.

In the modification seen in FIGS. 6 and 7, the tangs 28 are deleted from the cage 10 and grip wedges 29 are formed on the core 11 and engage the top of the workpiece so as to prevent downward movement of the nut assembly as seen in FIGS. 6 and 7 while the fingers 27 prevent upward movement.

In the modifications seen in FIGS. 8 and 9, it is to be noted that both the cage tangs 28 and the core grip wedges 29 are employed and that they co-operate with one another in preventing downward movement of the nut assembly as seen in FIGS. 8 and 9. It is to be further noted that on the open side of the cage member 10 additional grip wedges 28 as seen in FIG. 8 are provided so as to supplement the holding ability of the nut assembly in the downward direction in addition to the combined resistance of the core grip wedges 29 co-operating with the cage tangs 28 as seen in FIG. 9.

In assembling the device it is only necessary to form the cage 10 as seen, insert the core 11 therein, and spin or peen the neck 22 over the head 23 so as to prevent disassembly between the cage 10 and the core 11; obviously the neck of the core is provided with sufficient material height over the collar 21 so as to provide material in the proper area for spinning the head 23 over the collar 21 and it is to be further noted that the shoulders 20 of the cage prevent movement in the opposite direction by engaging the top of the core 11 itself. In assembling the modification seen in FIGS. 6 through 9 the same procedure is employed.

In operation, the user forms an aperture in the workpiece of suitable size and conformation to receive the nut assembly whereupon he advances the head 23 of the device towards the aperture 26 such as from the bottom of the workpiece as seen in the drawing and then exerts sufficient force to push the nut assembly through the aperture whereupon the tangs 28 spring inwardly to permit by-passing through the aperture and upon completely travelling through the aperture they spring outwardly and engage the top surface of the workpiece in opposition to the fingers 27 thereby locking the nut assembly on the workpiece between the tangs 28 and the fingers 27.

In the insertion of the device seen in FIGS. 6 and 7 the grip wedges 29 move inwardly to permit by-passing through the workpiece aperture and the core 11 deforms to permit this inward movement of the grip edge wedges 29 due to the fact that the core aperture allows deformation as the bolt 12 is not inserted in the core aperture 31.

In mounting devices in FIGS. 8 and 9, both the tangs 28 and grip wedges 29 move inwardly as the nut assembly is forced through the workpiece aperture as hereinbefore described in conjunction with the other figures however, after the nut assembly has been inserted in the workpiece aperture it is obvious that the holding capabilities of the tangs 28 and the grip wedges 29 supplement each other singly and in combination.

After the nut assembly is inserted in the workpiece as described, the bolt 12 is preferably self threaded through the core aperture 31 and this is preferable in use as it provides speedy operation and also better self locking characteristics, due to the fact that as the threads of the bolt go through the material of the body 11 they swage the material in the inserting direction which helps prevent rotation in the reverse loosening direction and the self threading operation of the bolt 30 in the core aperture 31 additionally expands the core neck 22 against the collar 21 which reacts to exert inward force against the bolt 30 so that the bolt 30 is securely locked against reverse rotation in the core. Threaded core apertures are also satisfactory in this regard.

Moreover, after the bolt has been inserted in the core aperture 31 the core head 23 is held against inward movement relative to the cage collar 21 and therefore prevents disengagement between the core head 23 and the cage collar 21 and the presence of the bolt also insures against inward movement of the grip wedges 29 as seen in FIGS. 7 through 9 as there is no place for the wedges to move as the core body aperture is now occupied by the solid body of the bolt.

The inventive device is inexpensively manufactured and assembled, quickly mounted in a workpiece, is easily engageable by a screw or bolt so that complete manufacturing efficiency is assured with the use of the device which not only provides for quick operation but which also insures the locking of the bolt in the nut assembly preventing its reverse rotation and preventing its loosening even under highly vibratory conditions and this device has been tested on vibrating machines where it securely holds while other attaching means also being vibrated have moved completely out of fastening relationship.

The inventive nut assembly with these features constitutes a compact, durable, and neat appearing mechanism which is highly useful to mass production in industry.

Although but a single embodiment of the invention has been shown and described in detail together with two modifications, it is obvious that many changes may be made in the size, shape, detail, and arrangement of the various elements of the invention within the scope of the appended claims.

I claim:

1. In combination, a self attaching, bolt locking, and axially two-way bolt tension resisting and holding nut assembly comprising a workpiece having spaced walls defining a receiving aperture, a first side, and an opposite side; a plastic core having opposite sides, a neck surmounting said core, and a hollow bolt receiving bore through said core and neck; a cage having a collar surrounding said core neck, shoulders overlying said core, arms depending from said cage shoulders on opposite sides of said core terminating in projecting ends, laterally extending fingers on said arms projecting ends engaging one side of said workpiece, and tangs lanced out of said cage angling sidewise downwardly outwardly from said cage shoulders engaging the opposite side of a workpiece in opposition to said fingers; a head on said core neck overlying said cage collar holding said core in said cage; said tangs being springwise resiliently depressible to by-pass said workpiece walls defining said workpiece aperture in inserting said assembly in a workpiece and to spring outwardly to overlie said workpiece side after passing through said workpiece aperture; and a bolt disposed in said core aperture; said core being blocked against axial movement relative to said cage in one direction by said core head abutting said cage collar and from axial movement in the other direction by said core abutting said cage shoulders; said cage being blocked against axial movement relative to said workpiece by said fingers in one axial direction and by said tangs in the other axial direction; said cage having at least one angular side lying in said workpiece aperture with said workpiece walls defining said aperture having at least one mating angular side preventing relative rotational movement therebetween; said bolt preventing plastic flow of said core inwardly and said cage collar preventing plastic flow of said core neck and head outwardly thereby insuring bolt and core engagement and core head and cage collar engagement; relative rotational movement between said core and cage being prevented by engagement between said core and said cage arms; and at least one grip wedge on said core body side angling downwardly outwardly from said core body adapted to compressibly deform with said body in insertion in a workpiece, to expand in interlocking relation to a workpiece side after insertion, and to be blocked against deforming said body to move out of interlocking relation with said workpiece side by said bolt inserted in said body bore; said core locking said bolt against reverse rotation preventing loosening of said bolt even under high vibrational conditions.

2. A self attaching, bolt locking, and axially two-way bolt tension resisting and holding nut assembly combination for insertion in a workpiece having spaced walls defining a receiving aperture, a first side, and an opposite side; comprising a plastic core having opposite sides, a neck, and a hollow bolt receiving bore through said core and neck; a cage having a collar surrounding said core neck, shoulders overlying said core, arms depending from said cage shoulders on said opposite sides of said core terminating in projecting ends, laterally extending fingers on said arms projecting ends for engaging one side of a workpiece, and tangs lanced out of said cage angling sidewise downwardly outwardly from said cage shoulders for engaging the opposite side of a workpiece in opposition to said fingers; a head on said core neck overlying said cage collar holding said core in said cage; said tangs being springwise resiliently depressible to by-pass a workpiece walls defining the workpiece aperture in inserting said assembly in a workpiece and to spring outwardly to overlie the workpiece side after passing through the workpiece aperture; said core aperture being adapted to receive a bolt; said core being blocked against axial movement relative to said cage in one direction by said core head abutting said cage collar and from axial movement in the other direction by said core abutting said cage shoulders; said cage being blocked against movement relative to a workpiece by said fingers in one axial direction and by said tangs in the other axial direction; said cage having at least one angular side lying in a workpiece aperture having at least one angular mating abutting side preventing relative rotational movement therebetween; inward plastic flow of said core being prevented by a bolt being disposed in said core bore with said cage collar preventing plastic flow of said core neck and head outwardly thereby insuring bolt and core engagement and core head and cage collar engagement; relative rotational movement between said core and cage being prevented by engagement between said core opposite sides and said cage arms; and at least one grip wedge on said core angling downwardly outwardly from said core top adapted to compressibly deform with said core in insertion in a workpiece, to expand in interlocking relation to a workpiece side after insertion, and to be blocked against deforming said core to move out of interlocking relation with a workpiece side by a bolt inserted in said core bore; said core locking a bolt against loosening reverse rotation.

3. A self attaching, bolt locking, axially two-way bolt tension resisting and holding nut assembly combination for insertion in a workpiece having spaced walls defining a receiving aperture, a first side, and an opposite side, comprising a plastic core having a body, opposite sides on said core, a neck surmounting said core, and grip wedges on said core angling downwardly outwardly from said core top, and a hollow bolt receiving bore through said core and neck; a cage member having a collar surrounding said core neck, shoulders overlying said core, arms depending from said cage shoulders on said opposite sides of said core terminating in projection ends, and laterally extending fingers on said arms projecting ends for engaging one side of a workpiece; said core grip wedges operating to engage the opposite side of a workpiece in opposition to said cage fingers; a head on said core neck overlying said cage collar holding said core in said cage; said grip wedges being springwise resiliently depressible to by-pass the workpiece walls defining the workpiece aperture in inserting said assembly in a workpiece and to spring outwardly to overlie the workpiece side after passing through the workpiece aperture; said core aperture being adapted to receive a bolt; said core being blocked against axial movement relative to said cage in one direction by said core head abutting said cage collar and from axial movement in the other direction by said core abutting said cage shoulders; said cage being blocked against movement relative to a workpiece by said fingers in one axial direction and by said core wedges in the other axial direction; said cage having at least one angular side lying in a workpiece aperture having at least one angular mating abutting side preventing relative rotational movement therebetween; inward plastic flow of said core being prevented by a bolt being disposed in said core bore with said cage collar preventing outward plastic flow of said core neck thereby insuring bolt and core engagement and core head and cage collar engagement; relative rotational movement between said core and cage being prevented by engagement between said core opposite sides and said cage arms; and said grip wedges on said core compressible deforming with said body in insertion in a workpiece and expanding in interlocking relation to a workpiece side after insertion, and block against deforming said body to move out of interlocking relation with a workpiece side by a bolt inserted in said core bore; said core locking a bolt against reverse loosening rotation.

References Cited in the file of this patent

UNITED STATES PATENTS

| | | |
|---|---|---|
| 2,358,206 | Boersma | Sept. 12, 1944 |
| 2,836,215 | Rapata | May 27, 1958 |
| 2,896,889 | Hershberger et al. | July 28, 1959 |

FOREIGN PATENTS

| | | |
|---|---|---|
| 861,586 | Great Britain | Feb. 22, 1961 |